(12) United States Patent
Rubin (10) Patent No.: US 8,098,815 B2
(45) Date of Patent: *Jan. 17, 2012

(54) DEVICE, SYSTEM AND METHOD FOR CRYPTOGRAPHIC KEY EXCHANGE

(76) Inventor: Frank Rubin, Wappingers Falls, NY (US)

( * ) Notice: Subject to any disclaimer, the term of this patent is extended or adjusted under 35 U.S.C. 154(b) by 1165 days.

This patent is subject to a terminal disclaimer.

(21) Appl. No.: 11/852,299

(22) Filed: Sep. 8, 2007

(65) Prior Publication Data

US 2008/0069346 A1    Mar. 20, 2008

Related U.S. Application Data

(63) Continuation-in-part of application No. 11/748,209, filed on May 14, 2007, and a continuation-in-part of application No. 11/748,217, filed on May 14, 2007.

(60) Provisional application No. 60/828,998, filed on Oct. 11, 2006.

(51) Int. Cl.
*H04L 21/00* (2006.01)

(52) U.S. Cl. ........................................... 380/28

(58) Field of Classification Search ..................... 380/28
See application file for complete search history.

(56) References Cited

U.S. PATENT DOCUMENTS

| | | | |
|---|---|---|---|
| 4,200,770 A | 4/1980 | Hellman et al. | |
| 4,567,600 A | 1/1986 | Massey et al. | |
| 5,159,632 A | 10/1992 | Crandall | |
| 5,271,061 A | 12/1993 | Crandall | |
| 5,987,130 A | 11/1999 | Chang | |
| 6,052,466 A | 4/2000 | Wright | |
| 6,212,279 B1 | 4/2001 | Reiter et al. | |
| 6,289,105 B1 | 9/2001 | Murota | |
| 6,307,936 B1 | 10/2001 | Ober et al. | |

(Continued)

FOREIGN PATENT DOCUMENTS

WO    WO 03/007540 A1    1/2003

OTHER PUBLICATIONS

"Application to Cryptography." Dec. 14, 2003 from Internet Archive Wayback Machine. http://aix1.uottawa.ca/~jkhoury/cryptography.htm pp. 1-4.*

(Continued)

*Primary Examiner* — Nasser Moazzami
*Assistant Examiner* — Lisa Lewis
(74) *Attorney, Agent, or Firm* — Jay R. Yablon (57) ABSTRACT

A method is disclosed whereby two parties can establish a cryptographic key for secure communications without any prior distribution of secret keys or other secret data, and without revealing said key to any third party who may have access to all of the transmissions between them. The two parties agree upon a matrix M, and two commutative families of square matrices F and G. The sender chooses a matrix S from F and a matrix T from G. The receiver independently chooses a matrix R from F and a matrix Q from G. The sender transmits the matrix SMT to the receiver and the receiver transmits the matrix RMQ to the sender. The sender computes the matrix SRMQT from the received matrix RMQ, and the receiver computes the matrix RSMTQ from the received matrix SMT. Since the matrices S and R commute, and the matrices T and Q commute, SRMQT=RSMTQ. The value of the matrix SRMTQ is then used to produce the desired cryptographic key.

18 Claims, 2 Drawing Sheets

U.S. PATENT DOCUMENTS

| | | |
|---|---|---|
| 6,363,154 B1 | 3/2002 | Peyravian et al. |
| 6,377,689 B1 | 4/2002 | Vanstone et al. |
| 6,785,813 B1 | 8/2004 | Vanstone et al. |
| 6,987,855 B1 | 1/2006 | Srivastava |
| 6,993,136 B2 | 1/2006 | Solinas |
| 7,020,282 B1 | 3/2006 | Chang |
| 7,065,210 B1 | 6/2006 | Tsujii et al. |
| 7,073,066 B1 | 7/2006 | Nessett |
| 7,080,255 B1 | 7/2006 | Kasahara et al. |
| 7,096,356 B1 | 8/2006 | Chen et al. |
| 7,107,246 B2 | 9/2006 | Wang |
| 7,111,322 B2 | 9/2006 | Slick et al. |
| 7,120,696 B1 | 10/2006 | Au et al. |
| 7,149,308 B1 | 12/2006 | Fruehauf et al. |
| 7,156,299 B1 | 1/2007 | Harris et al. |
| 7,167,565 B2 | 1/2007 | Rajasekaran |
| 7,181,014 B1 | 2/2007 | Srivastava |
| 7,181,015 B2 | 2/2007 | Matt |
| 7,245,722 B2 | 7/2007 | Hirota et al. |
| 7,263,619 B1 | 8/2007 | Kim |
| 2004/0258240 A1* | 12/2004 | Singh .................. 380/30 |
| 2008/0037774 A1* | 2/2008 | Slavin .................. 380/30 |
| 2008/0310622 A1* | 12/2008 | Drehmel et al. ........... 380/29 |

OTHER PUBLICATIONS

Coglianese et al. (authors), Maitra et al. (editors) "MaTRU: A New NTRU-Based Cryptosystem" from book Progress in Cryptology—Indocrypt 2005. 6th International Conference on Cryptology in India Proceedings. Springer. Dec. 2005, pp. 1-3.*

RSA Laboratories. "What is Diffie Hellman?" www.rsa.com/rsalabs/node.asp?id=2248 May 6, 2007 from Internet Archive Wayback Machine pp. 1-2.*

Menezes, A., Van Oorschot, P., and Vanstone, S., "Handbook of Applied Cryptography," CRC Press, 1996, p. 500.

Rubin, Frank, "Arithmetic Stream Coding Using Fixed Precision Registers," IEEE Trans. on Info. Theory 25 (Nov. 1979), pp. 672-675.

Rubin, Frank, "NK-CRYPT Message Encryption System," www.mastersoftware.biz/nkcrypt.htm.

www.bindhast.com/keylilla.htm.

* cited by examiner

DEVICE, SYSTEM AND METHOD FOR CRYPTOGRAPHIC KEY EXCHANGE

CROSS-REFERENCE TO RELATED APPLICATIONS

This application claims benefit of pending provisional application U.S. 60/828,998 filed Oct. 11, 2006. This application is also a continuation-in-part of pending applications U.S. Ser. No. 11/748,209 and U.S. Ser. No. 11/748,217, each filed May 14, 2007.

FIELD OF THE INVENTION

This invention relates to the field of cryptography, and in particular, to a device, system and method which allows two parties to agree upon a cryptographic key without prior distribution of secret keys or other secret data, and without revealing said key to a third party eavesdropper.

BACKGROUND OF THE INVENTION

Since 1800 the most widely-used methods for secret communications have been secret key encryption methods. Messages are encrypted using a secret key known only to the communicating parties. These keys needed to be distributed to all of the communicating parties, and kept strictly secret from all unauthorized third parties.

In the past, keys were distributed mainly by personal contact, by couriers, or by diplomatic pouch. These methods are unsuitable for modern electronic communications. Keys need to be distributed in a fraction of a second for immediate use.

Modern methods of key distribution generally fall into two classes. The first class depends on having a key authority, a key server, or a key repository. This facility generates keys for each message to be sent, and distributes those keys to all of the parties. This method usually requires each user or client to have a unique ID and some secret parameters which are stored by the key authority. The server generates message keys based on the IDs and secret parameters of the various parties, and sends the message keys to the parties encrypted with their secret keys. So this class of key distribution requires some infrastructure, and some secret keys already distributed to the communicating parties. There also have to be protocols for adding new parties to the network, which might involve physically delivering a key to a new party in the form of a key chip, a disk or a flash drive.

The second method, which is sometimes called key synchronization, requires each communicating party to have a unique ID and some secret data associated with that ID. Either each party must have a table associating all of the user IDs with their corresponding secret data, or there must be repository on the network from which each party can get this secret information. The IDs may be public knowledge, and may be communicated openly, but the secret data must never be divulged. A key for each message between two parties is constructed from their secret data and some additional data unique to that message, such as a message sequence number, or simply the date and time when it is sent. All of this must be set up in advance before any messages can be sent. Each party uses this information to calculate the message key.

Basically, in the first class the key authority generates the message keys and distributes them, but in the second class each party computes the keys in such a way that all parties arrive at the same key. In both classes each user must be supplied beforehand with secret keys and/or secret parameters used to generate keys. There is no way that two parties can establish secure communications without this prior arrangement.

Some patents which describe or utilize these methods are U.S. Pat. Nos. 4,200,700, 5,159,632, 5,271,061, 5,987,130, 6,052,466, 6,212,279, 6,289,105, 6,307,936, 6,363,154, 6,377,689, 6,785,813, 6,987,855, 6,993,136, 7,020,282, 7,065,210, 7,073,066, 7,080,255, 7,096,356, 7,107,246, 7,111,322, 7,120,696, 7,149,308, 7,156,299, 7,167,565, 7,181,014, 7,181,015, 7,263,619, and 7,245,722.

Until recently there was no method for two parties to establish secret communications without prior distribution of secret keys or other secret data if all of their transmissions were being monitored. The great breakthrough in this field is disclosed in U.S. Pat. No. 4,200,770 to Hellman-Diffie-Merkle. In this invention two parties A and B, agree on a large prime number p and a number x in the range 2 to p−2. The two parties independently choose random exponents a and b in the range 2 to p−2. The two parties then raise the base x to the powers a and b modulo p. A sends $x^a$(mod p) to B, and B sends $x^b$(mod p) to A. The two parties then raise the numbers they receive to their own powers. That is, A raises $x^b$(mod p) to the a power, to get $x^{ba}$(mod p), while B raises $x^a$(mod p) to the b power to get $x^{ab}$(mod p). Since $x^{ba}=x^{ab}$ both parties end up with the same final result, namely $x^{ab}$(mod p) which is then used to produce the cryptographic key for encrypting and decrypting the message.

This allows secure cryptographic keys to be generated on the fly, without any prior distribution of secret keys between the parties. The method is secure because it is computationally difficult to calculate a when p, x and $x^a$(mod p) are given.

The main drawback of the Hellman-Diffie-Merkle key exchange is that it is slow. In order to make the key exchange secure the prime p must be chosen to be very large, at least 100 decimal digits, and preferably more than 200 decimal digits. This makes calculating the quantities $x^a$(mod p), $x^b$(mod p) and $x^{ab}$(mod p) very time-consuming.

The underlying reason why Hellman-Diffie-Merkle key exchange is secure is that exponentiation modulo p is a one-way function. In general, a one-way function f(x,y) is a function where it is easy to compute f(x,y) given the inputs x and y, but difficult or impossible to compute the values of x and y given f(x,y), or where it is difficult or impossible to compute the value of y given x and f(x,y). The best-known example is that it is easy to compute the product pq of two large primes p and q, but given pq it is difficult to factor it into the primes p and q.

Another example of a one-way function is multiplying a vector V by a square matrix M to produce a vector W=MV. Given V and W it is impossible to determine the matrix M. If M is an n×n square matrix and V is an n×1 column vector, then W will also be an n×1 column vector. It is impossible to determine M from V and W because the $n^2$ elements of M are $n^2$ unknown quantities, but MV=W gives only n linear equations in $n^2$ unknowns. For n>1 it is not possible to determine $n^2$ unknowns from only n linear equations. To be clear, it is not merely difficult, as in the case of factoring large numbers, it is impossible.

The essence of the invention herein disclosed, then, is to use the fast operation of matrix multiplication in place of the slow operation of raising a number to a large power modulo a large prime. This will provide a method of key exchange which is both fast and secure. Two variations will be presented, which may be called the one-sided method and the two-sided method.

To lay the foundation for the disclosure and analysis of the invention, it is helpful to review some computer and mathematics basics which underlie the invention. In most modern computers, data, such as letters and numbers, are represented as binary numbers, that is, numbers in the base 2. Each binary digit, or bit, in a binary number may take either the value 0 or the value 1. A group of 8 bits, called a byte, is commonly used to represent small numbers or letters. For example, the byte 01000001 represents the number 65, or the letter "A" in ASCII code.

The ordinary operations of addition, subtraction, multiplication and division can be performed on binary numbers. There are also bitwise logical operations, also called Boolean operations, that can be performed on binary numbers, namely bitwise "and", bitwise "or" and bitwise "exclusive-or" or "xor". These operations are performed separately for each corresponding bit position. For example:

| AND | OR | XOR |
|---|---|---|
| 00001111 | 00001111 | 00001111 |
| 01010101 | 01010101 | 01010101 |
| 00000101 | 01011111 | 01011010 |

In a byte the leftmost bit is called the high-order bit and has the numeric value $2^7$ or 128, while the rightmost bit is called the low-order bit, or least-significant bit, and has the numeric value $2^0$ or 1.

In terms of the underlying mathematics, if m and n are positive integers, then the residue of n modulo m means the remainder when n is divided by m. The residue of n modulo m is denoted n (mod m) and m is called the modulus. So 42 (mod 10)=2. If x and y have the same residue modulo m this is denoted x=y (mod m). For example, 32=42 (mod 10). Any number which evenly divides m is called a factor of m. If n is a factor of m then m=0 (mod n), for example 12=0 (mod 4). If a positive integer p has no factors except 1 and p itself, then p is called a prime number, or simply a prime. For example, 2, 3, 5, 7 and 11 are primes, but 9 is not prime because it is evenly divisible by 3. If m and n have no factors in common then they are called relatively prime. For example, 8 and 15 are relatively prime.

A matrix is a rectangular array of elements, also called entries. In the simplest case the elements, or scalars, will be numbers. In more advanced treatments of matrices the scalars are elements of a mathematical entity called a ring, and the matrix is said to be over the ring. For present purposes it is sufficient to note that there are two operations on the elements of a ring, commonly called scalar addition and scalar multiplication. Scalar addition, or simply addition, is usually denoted x+y, and scalar multiplication, or simply multiplication, is denoted xy. Scalar addition in a ring is commutative, that is x+y=y+x. If the scalar multiplication is commutative, that is, if xy=yx for all x and y, then the ring is called commutative.

Each ring element has an additive inverse. If every element in the ring, except 0, has a multiplicative inverse, then the ring is called a field. The additive inverse of the scalar x is denoted −x and addition of the additive inverse a+(−x) is normally shortened to a−x, with x−x=0. The multiplicative inverse, when it exists, is denoted x', with xx'=x'x=1. The multiplication operation in a ring is distributive over addition, which means that x(a+b)=xa+xb and (a+b)x=ax+bx for all a, b and x.

A well-known example of a ring is the integers using standard addition and multiplication. Every integer n has an additive inverse −n, but only the integers 1 and −1 have multiplicative inverses. A well-known example of a field is the rational numbers a/b, where a and b are integers and b≠0. The additive inverse of the rational number a/b is −a/b, and exists for all rational numbers. The multiplicative inverse (a/b)' of the rational number a/b is b/a and exists for every rational number except 0.

Another example of a ring is the integers modulo some number m. The additive inverse of x modulo m is m−x (mod m). Every integer n which is relatively prime to m will have a multiplicative inverse n' such that nn'=1 (mod m). In particular, if m is of the form $2^u$ then n will have a multiplicative inverse when it is odd.

A matrix A with m rows and n columns is called a matrix of size m×n, or order m×n, or simply an m×n matrix. The element in the i-th row and j-th column is designated $A_{ij}$ where i can range from 1 to m, and j can range from 1 to n. A matrix with only 1 row is called a row matrix, a matrix with only 1 column is called a column matrix, and a matrix with an equal number of rows and columns is called a square matrix. That is, a row matrix is 1×n, a column matrix is n×1, and a square matrix is n×n.

An m×n matrix A and an n×p matrix B can be multiplied to produce an m×p matrix C. This is denoted AB=C and C is called the matrix product of A and B. The element $C_{ij}$ in the i-th row and j-th column of C is formed from the i-th row of A and the j-th column of B by summing $A_{i1}B_{1j}+A_{i2}B_{2j}+\ldots+A_{in}B_{nj}$. The addition and multiplication in this expression is the scalar addition and multiplication in the ring.

Matrix multiplication is associative. That is, if A is an m×n matrix, B is an n×p matrix, and C is a p×r matrix, then (AB)C=A(BC). Consequently, the set of n×n square matrices over a ring is itself a ring.

In a square n×n matrix A an element $A_{ii}$ is called a diagonal element, and the set of elements $A_{11}, A_{22}, \ldots, A_{nn}$ is called the diagonal of the matrix. A diagonal matrix is a matrix whose only non-zero elements all lie on the diagonal. The diagonal matrix I whose diagonal elements are all 1 is called the identity matrix. The identity matrix has the property that AI=A and IA=A for any square matrix A.

Matrix multiplication is not commutative. That is, in most cases the matrix product AM will not be the same as MA. In the case AM we say that M is left-multiplied by A, and in the case MA we say that M is right-multiplied by A. If all of the matrices in a set F of matrices commute with each other, then F is called a commutative family of matrices. All of the matrices in a commutative family must be square matrices of the same size. If the ring is commutative, then the n×n diagonal matrices over the ring form a commutative family, but other commutative families, containing non-diagonal matrices, may also exist. It is possible to have a commutative family of matrices over a ring even when the ring itself is not commutative.

If A and B are in the commutative family F, then the product AB commutes with every matrix in F. If C is in F, then (AB)C=A(BC)=A(CB)=(AC)B=(CA)B=C(AB), that is, C commutes with AB. A commutative family F will be called closed if for each pair of matrices A and B in F their product AB is also in F. It will henceforth be assumed that each commutative family of matrices is closed.

SUMMARY OF THE INVENTION

Two parties wish to communicate using an (unspecified) encryption method for which a secret key is required. The sender will use the secret key to encrypt the message, and the receiver must use the same key in order to correctly decrypt the sender's message. The two parties have made no prior arrangements concerning cryptographic keys. They communicate only via an insecure network in which third party eavesdroppers could potentially read all of their messages. The purpose of this invention is to provide a means whereby the two parties can establish cryptographic keys without permitting any eavesdropper to obtain or deduce those keys.

In a one-sided embodiment of this invention, the two parties select the cryptographic key by the following steps: (1) They agree upon a randomly chosen common matrix M. (2) The sender randomly chooses a matrix S, and the receiver independently and randomly chooses a matrix R from a large commutative family F of square matrices. (3a) The sender left-multiplies the common matrix M by the chosen matrix S and sends the product SM to the receiver. (3b) The receiver left-multiplies the common matrix M by the chosen matrix R and sends the product RM to the sender. (4a) The sender left-multiplies the matrix RM by the matrix S and uses the resulting matrix SRM=RSM to produce the key for encrypting the message. (4b) The receiver left-multiplies the matrix SM by the matrix R and uses the resulting matrix RSM=SRM to produce the key for decrypting the message.

Equivalently, all of the matrix multiplication can be done as right matrix multiplication.

In a two-sided embodiment of this invention, the two parties select the cryptographic key by the following steps: (1) They agree upon a randomly chosen common matrix M. (2) The sender randomly chooses matrices S and T, and the receiver independently and randomly chooses matrices R and Q. S and R are chosen from a large commutative family F of square matrices, while T and Q are chosen from a second large commutative family G of square matrices. (3a) The sender multiplies the common matrix M on both sides by the chosen matrices S and T and sends the product SMT to the receiver. (3b) The receiver multiplies the common matrix M on both sides by the chosen matrices R and Q and sends the product RMQ to the sender. (4a) The sender multiplies the matrix RMQ by the matrices S and T and uses the resulting matrix SRMQT=RSMTQ to produce the key for encrypting the message. (4b) The receiver multiplies the matrix SMT by the matrices R and Q and uses the resulting matrix RSMTQ=SRMQT to produce the key to decrypt the message.

By using a suitable type of matrix multiplication, and sufficiently large matrices, the method can be made arbitrarily secure while still being fast.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION

The two primary embodiments, respectively comprising one-sided and two-side matrix multiplication, will be sketched briefly, then described in more detail. This will set the stage for an analysis of the security and the speed of various embodiments of the invention.

Figure 1:
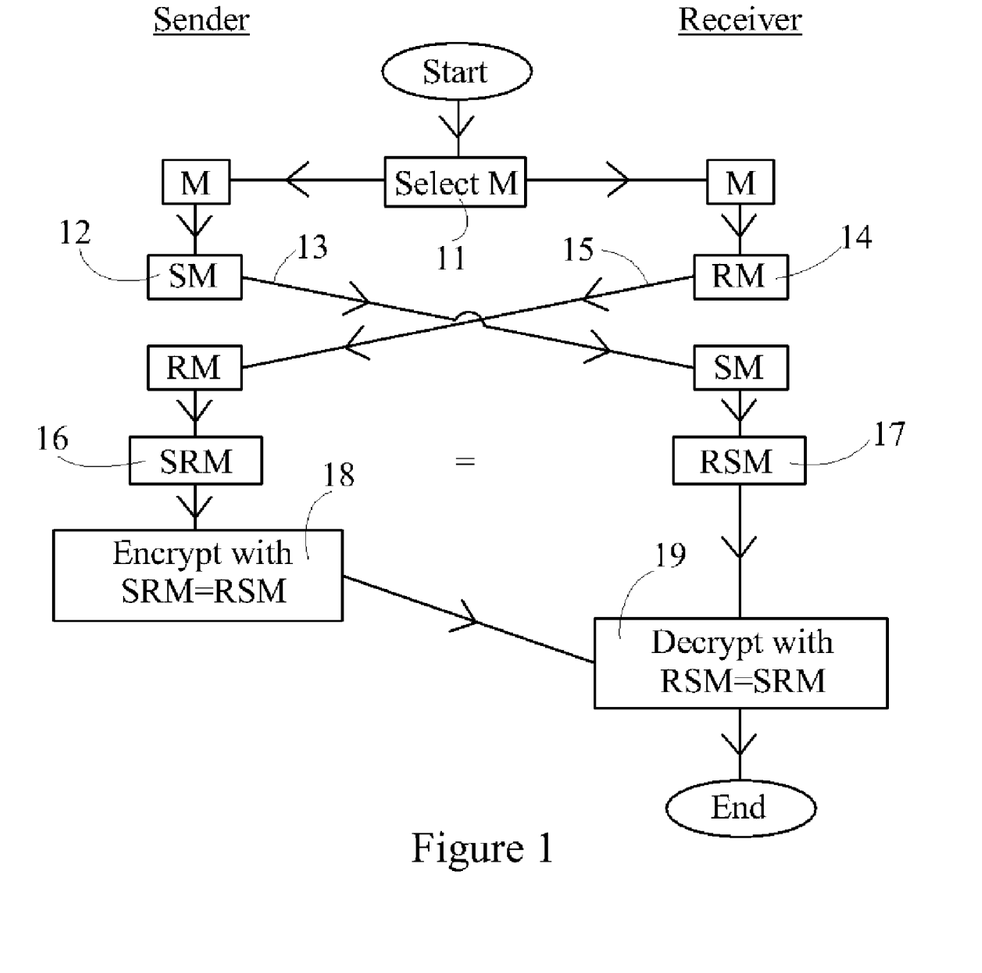
FIG. 1 is a flow chart illustrating a first preferred embodiment of the invention comprising one-sided matrix multiplication.

Referring to FIG. 1, in the one-sided method, the two parties (sender and receiver) agree on a common matrix M (11). This can be done by way of telecommunications between the parties, and the invention is designed to be secure even on the supposition that an eavesdropper intercepts and knows this common selection of M. The sender chooses a matrix S, multiplies M by S (12) (though we illustrate left-multiplication, it is understood throughout that right-multiplication can also be used within the scope of the disclosure and claims), and sends the matrix SM to the receiver (13). The receiver chooses a matrix R, multiplies M by R (14) and sends the matrix RM to the sender (15). The sender then multiplies RM by the matrix S to get SRM (16), while the receiver multiplies SM by R to get RSM (17). The two matrices S and R are chosen from a commutative family of matrices, so that the matrices SRM and RSM will be equal. This matrix, SRM=RSM is then used, in whole or in part, as the basis for the cryptographic key K employed by the sender to encrypt (18) and the receiver to decrypt (19) the message.

Figure 2:
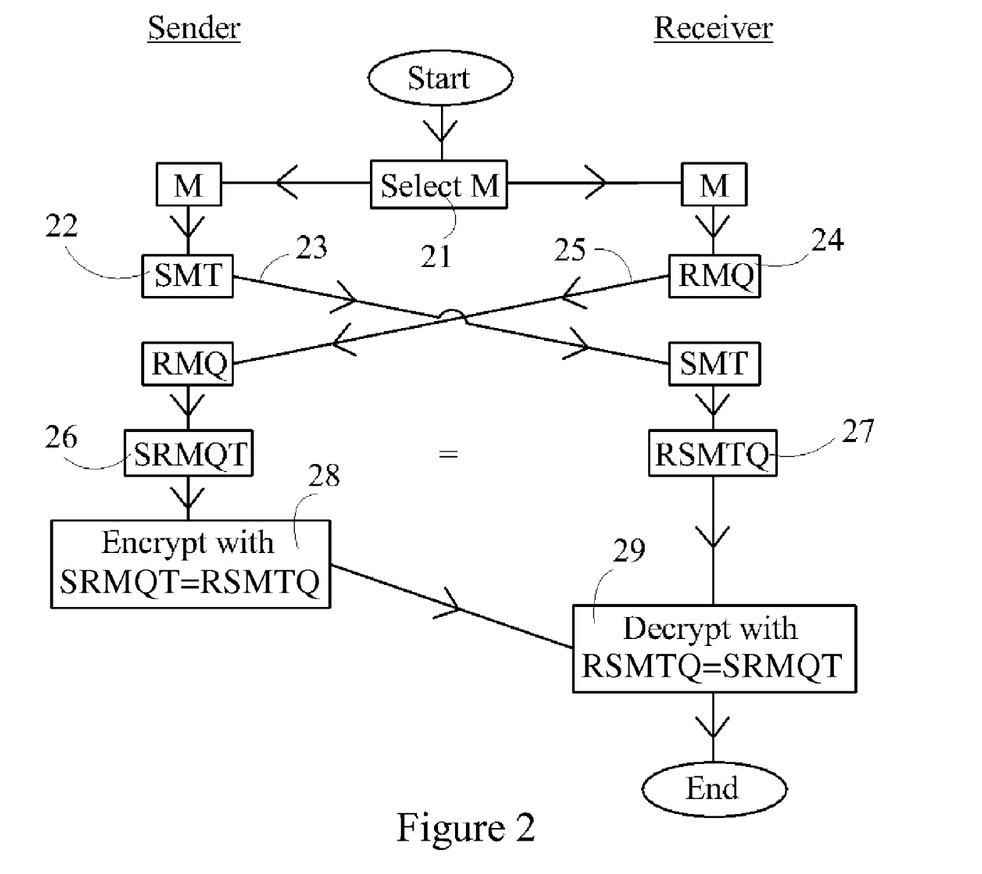
FIG. 2 is a flow chart illustrating a second preferred embodiment of the invention comprising two-sided matrix multiplication.

Referring to FIG. 2, in the two-sided method, the two parties similarly agree on a common matrix M (21). Again, this can be done by way of telecommunications between the parties, and the invention is designed to be secure even on the supposition that an eavesdropper intercepts and knows this common selection of M. The sender chooses two matrices S and T, multiplies M on one side by S and on the other side by T (22), and sends the matrix SMT to the receiver (23). The receiver chooses two matrices R and Q, multiplies M on one side by R and on the other side by Q (24), and sends RMQ to the sender (25). The sender then multiplies RMQ by the matrices S and T to get SRMQT (26), while the receiver multiplies SMT by R and Q to get RSMTQ (27). The matrices S and R are chosen from one commutative family of matrices, and the matrices T and Q are chosen from a second commutative family of matrices so that SRMQT and RSMTQ will be equal. This matrix, SRMQT=RSMTQ is then used, in whole or in part, as the basis for the cryptographic key K employed by the sender to encrypt (28) and the received to decrypt (29) the message.

The one-sided method can use either left side matrix multiplication or right side matrix multiplication. The two are equivalent, as long as both parties multiply on the same side.

While this disclosure speaks of using the key matrix SRM=RSM (one-sided) or SRMQT=RSMTQ (two-sided) to produce the cryptographic key K, it is understood that all of the key matrix, or only a part of the matrix, may be used to produce the key. Typically the key matrix will be larger than an encryption key, so the sender and receiver will need to agree on which bits from the key matrix are to be used to produce the key. It is further understood that those bits of the key matrix which are used to produce the key may be taken in order, or scrambled, or otherwise processed to derive the key. While this disclosure speaks of encrypting a message, it is understood that the key may be used to encrypt all or part of a message. While this disclosure speaks of the sender and receiver arriving at the same key, it is understood that one or more key matrices may be developed in accordance with this disclosure, and that each such key matrix may be used to produce one or more cryptographic keys.

Suppose that Sender wishes to send a message X to Receiver. Assume that all communications between Sender and Receiver are being monitored by an eavesdropper. Sender and Receiver have agreed upon a method of encryption which requires a secret key for each message. Both Sender and Receiver must use the same key in order to communicate. They wish to select a secret key without allowing the eavesdropper to discover the key. That is, they assume that the eavesdropper has complete access to everything transmitted between them, including complete knowledge of the methods being used. Even with all of this information at hand, it must be effectively impossible for the eavesdropper to determine the key.

Note that Sender and Receiver cannot simply encrypt the key using some other encryption method. That second method would also require a key, which would still require some method of key selection, key exchange or key distribution, ad infinitum.

The security of any cryptographic method is a question of degrees. The current standard for security is that the eavesdropper must have to try about $2^{128}$ keys to solve a message. It is understood that the standard will change with time, as computers get faster, so the figure $2^{128}$ should be understood as an example of a standard. This disclosure will present embodiments of the invention which meet or exceed this standard. When the standard increases in the future, the methods of this disclosure can meet the newer standards simply by using larger matrices.

To begin the key selection process, Sender and Receiver must agree on a representation of the cryptographic keys as integers, must select a word size, must select a size for the matrices, and must agree upon a random matrix and choose random commutative matrices. In practice, the representation of the keys as integers, and the word size, will be determined by the device or software used for encrypting and decrypting the messages. The matrix size will be chosen beforehand as a trade-off between security and speed. The commutative families of matrices will be chosen or generated by some mathematical algorithms, and the choice will be encapsulated in the key-selection device or software. Only the choice of the common matrix M and the random multiplier matrices is made at the time the message is transmitted.

As noted earlier, matrix multiplication can be done using elements of an arbitrary ring. All such forms of matrix multiplication are deemed to fall within the scope of this invention. Various exemplars will be mentioned, such as using matrix multiplication with integers modulo a prime p, but the invention is not limited to such rings.

Consider first matrices over the ring of integers modulo a prime p. Several considerations go into the selection of the prime p and the size of the matrices. In general, larger matrices give greater security, while smaller matrices give greater speed. The time needed to multiply a matrix of size a×b and a matrix of size b×c is roughly proportional to abc. If F is a commutative family of n×n square matrices over the ring of integers modulo p, then the largest possible size (cardinality) of F is $p^n$. (Some of the matrices in this family will be cryptographically weak because they contain large numbers of zeroes, but the number of such matrices is small compared to $p^n$, so $p^n$ can be used as a working estimate.)

Let A be a chosen matrix in F. Every matrix in F must commute with A. If X is an unknown matrix in F, then the matrix equation AX=XA leads to a set of $n^2$ linear equations involving the $n^2$ scalar elements in the unknown matrix X. These equations reduce to n(n−d) linearly independent equations according to the size of the family F. The eavesdropper can exploit these equations to help determine the matrices S and R. Not every matrix in F will give the same value of d. To be safe, it should be assumed that the eavesdropper will choose wisely, and select a matrix A which gives the smallest possible value of d. It is not possible for the eavesdropper to obtain additional equations by using more matrices from F. All matrices for which d is minimum will yield the same set of n(n−d) equations.

Roughly, a commutative family determined by n(n−d) independent linear equations will contain about $p^{n/d}$ matrices. The exact number depends upon the factorization of $p^n−1$. Since $p^{n/d}$ must be at least $2^{128}$, n must be at least d(log $2^{128}$)/(log p). To keep n small, so that the matrix multiplication will be fast, it is essential for the sender and the receiver to choose a matrix family F where d is as small as possible.

Let the size of the common matrix M be b×c. In the one-sided embodiment this means that the multiplier matrices S and R must be size b×b. (Size c×c for right-multiplication.) The eavesdropper knows M, SM and RM, but does not know S and R. Knowing M, SM and RM provides bc linear equations involving the $b^2$ unknown scalars in S and bc linear equations involving the $b^2$ unknown scalars in R. Since S and R are members of F, this gives an additional b(b−d) linear equations for the scalars in S and in R. Therefore the eavesdropper will have b(b−d)+bc=b(b+c−d) linear equations for the $b^2$ unknown scalars in each of S and R. To be cautious, Sender and Receiver should assume the worst case, namely that all of these equations are linearly independent, giving the eavesdropper the most information.

If b(b+c−d) is $b^2$ or greater, then the eavesdropper can solve the equations and determine S and R. Therefore b(b+c−d)<$b^2$, so b+c−d<b, or c−d<0. This means that d>c. If c=0 then no key information is transmitted, so the smallest possible values are c=1 and d=2. The number of matrices in F must be at least $2^{128}$ for the assumed standard of security, so $p^{n/d}>2^{128}$ or $p^n>2^{256}$. Some sample values are p=257 with 32×32 matrices, p=65521 with 16×16 matrices, or p=$2^{31}$−1=2147483647 with 9×9 matrices. These matrix sizes give sufficient security with greatest speed, and they all provide at least 256 bits of key for the message encryption.

For the two-sided method, again let the common matrix M have size b×c. Then the multiplier matrices S and R must be size b×b and the multiplier matrices T and Q must be size c×c. Since S and T are in the commutative families F and G the eavesdropper will have b(b−d) linear equations involving the $b^2$ unknown scalars in S and c(c−e) linear equations involving the $c^2$ unknown scalars in T. The known values of M and SMT provide bc quadratic equations involving all of the $b^2c^2$ pairs of unknown values in S and T. The best way to attack such a system of mixed linear and quadratic equations is first to use the linear equations to substitute for some of the variables in the quadratic equations. In this way the number of unknowns in the quadratic equations can be reduced from $b^2$ to $b^2−b(b−d)$=bd, and from $c^2$ to $c^2−c(c−e)$=ce.

The result of this reduction is a set of bc quadratic equations in bd+ce unknowns. Since Sender and Receiver want to make d and e as small as possible, bc will be larger than bd+ce, so this set of equations will be over-determined. Most over-determined sets of equations will have no solutions, but in this case the eavesdropper knows that at least one solution exists, namely the matrices S and T. That means that the equations almost certainly have only one set of solutions, up to a constant multiplier. (If the ring is commutative and if S and T are one solution, then Sx and Tx' will be another solution, where x' is the multiplicative inverse of x.) The bc quadratic equations will involve linear combinations of the (bd)(ce)=de(bc) distinct pairs of remaining variables. If de=1 then there will be bc different products of one unknown element from S and one unknown element from T. These bc products can be treated as bc unknowns, and the bc quadratic equations can be treated as linear equations in these bc unknowns, and solved by standard methods of linear algebra.

If de>1 then there will be more than bc distinct products. Sets of polynomial equations over a ring can sometimes be solved by using a combination of two techniques, partial enumeration and extended linearization. Let us look at partial enumeration first. Suppose that de=2, for example d=1 and e=2, and that values for p, b and c were chosen such that there were at least $2^{128}$ matrices in both F and G. It would then be possible for the eavesdropper to enumerate the values for half of the unknown scalars in S. This would require enumerating about $2^{64}$ possible sets of values instead of $2^{128}$. With half as many variables remaining, the number of distinct products would be de(bc)/2=bc. This means that the bc quadratic equations could be solved as linear equations in bc unknowns.

Next, let us look at extended linearization. Call the remaining unknown S scalars $x_1, x_2, \ldots, x_b$ and the remaining unknown T scalars $y_1, y_2, \ldots, y_c$. The basic idea is to multiply the set of equations first by all possible linear terms $x_1, x_2, \ldots, x_b, y_1, y_2, \ldots, y_c$, then by all possible quadratic terms $x_1^2, x_1 x_2, \ldots, x_1 y_c, x_2^2, \ldots, x_2 y_c, \ldots, y_c^2$ and so forth. If the ring is commutative, then the number of distinct products of the variables will grow more slowly than the number of equations.

A numerical example might help illustrate extended linearization. Consider the case where b=c=20, d=e=2, and the ring is ordinary arithmetic modulo p=7159. (The matrix size 20×20 and the prime 7159 were chosen because $7159^{20}$ is about $1.08 \times 2^{256}$.) There would be $20^2 = 400$ distinct scalars in each matrix in the F and G families. The commutativity condition provides 20(20−2)=360 linearly independent equations for each set of variables. This reduces the number of unknowns to 40 for the F family and 40 for the G family. The eavesdropper knows the values of the matrices M and SMT. This gives 400 quadratic equations in the 80 unknowns, 40 from S and 40 from T. These 400 equations contain 1600 distinct products.

Since these equations have a homogeneous structure, a shortcut can be taken to simplify the extended linearization. It is sufficient to multiply these equations by products of the form $x_i y_j$ where $x_i$ is one of the 40 unknowns from S and $y_j$ is one of the 40 unknowns from T. That is, it is not necessary to multiply by products of the form $x_i x_j$ or $y_i y_j$. This greatly reduces the number of equations required. There are 1600 such products, so this gives 640,000 additional equations for a total of 640,400 equations. The number of distinct products occurring in these equations is 1600 quadratic terms and $(40 \cdot 41/2)^2 = 672,400$ quartic terms for a total of 674,000 products. If the 640,400 equations were all linearly independent (worst case), then it would be possible for the eavesdropper to solve these equations on today's high-end supercomputers using sparse-matrix techniques and partial enumeration. The eavesdropper could try all possible values for one of the variables in S and one in T. Since p=7159, this means that the set of 640,400 equations would need to be solved $p^2 = 51,251,281$ times. When one variable in each set of 40 is known the number of unknown products becomes $39^2 + (39 \cdot 40/2)^2 = 609,921$.

The 640,400 equations will produce many solutions, perhaps billions of solutions, for the 609,921 unknown products. Most of these solutions will be inconsistent, that is, there will not be any set of values for the remaining 78 unknown scalars which can produce those product values. All of these sets of solutions for the 609,921 products will have to be winnowed down to a relative handful that will result in S and T matrices which will produce the known value of SMT from the known value of M.

To complete this numerical example, suppose that solving n equations in n unknowns for large sparse matrices takes about $n^{2.5}$ elementary operations. Doing this $p^2$ times with p=7159 and n=640,000 takes a bit over $10^{22}$ or about $2^{74}$ elementary operations. This is much less than $2^{128}$, but it is still a daunting task. Recall that it depends on all of the 640,400 equations being linearly independent, which might not ever happen. It is more realistic to assume that the eavesdropper would need to enumerate at least 2 variables from each of S and T. This increases the amount of work to about $5 \times 10^{29}$, plus a similar amount of work to solve for the R and Q matrices. So using 20×20 matrices with p=7159 and d=e=2 might provide an adequate level of security for some applications.

In high security cryptography caution and care are the watchwords. There are three modifications that the sender and the receiver could use to improve the security: (1) Increase the size of the matrices. (2) Use matrices for which d and e are 3 rather than 2. (3) Use matrices over a ring which is not commutative. The pros and cons of these 3 solutions will now be discussed.

Increasing the size of the matrices is a speed-versus-security trade-off. If the matrices were increased from 20×20 to 30×30 the encryption time would increase in the ratio 27:8 or roughly by a factor of 3.4. The security would increase by a larger factor. There would be 900 equations in 120 unknowns, with 3600 distinct products. Extended linearization would expand this to 3,240,900 equations in 3,352,500 unknowns. This looks formidable, but the matrices are very sparse, with at most 3601 entries on any row, so the storage needed is still within the range of today's supercomputers. The number of elementary operations would be on the order of $10^{24}$ or $2^{80}$. This is an improvement by a factor of about 60 over the security for the 20×20 matrices, but still far short of the desired $2^{128}$ security level. Of course, this assumes that the 3,240,900 equations are linearly independent, which is unlikely.

Increasing d and e from 2 to 3, but still using 20×20 matrices would require increasing p from 7159 to 602257 or larger. Since $p^2$ would be greater than $2^{31}$ this might not be practical for certain types of hardware, and larger matrices with smaller values of p would be necessary. With b=c=20 and d=e=3 there would be 60 unknown scalars in each of the R and S matrices. This would make 400 equations with 120 unknowns, and 3600 distinct pairwise products. In this case it would not be adequate for the eavesdropper to multiply the 400 equations by the 3600 pairs $x_i y_j$ from R and Q. That would result in 1,440,400 equations in 3,352,500 unknowns. It would be necessary to multiply these 1,440,400 equations in turn by all of the pairs $x_i y_j$ giving an additional 5,184,000,000 equations, with an additional 1,430,352,400 unknowns. This is solvable in theory, but it is questionable whether any computer now existing or available in the near future could possibly handle such an enormous problem.

Using a non-commutative ring may be the best solution. With a non-commutative ring it cannot be assumed that $x_i x_j = x_j x_i$ for any pair of unknowns, so extended linearization cannot be used at all. It is more difficult to use a non-commutative ring. The ring addition and multiplication operations are typically performed using look-up tables. (If the ring addition operation is either normal addition or exclusive-or, then only the ring multiplication table would be needed.) Since the size of these operator tables is proportional to the square of the number of ring elements using a non-commutative ring takes more storage. For example, a ring of 256 elements would require operator tables of 65,536 bytes each. This might be too large for some applications, such as encryption chips imbedded in credit cards, identity badges, or currency.

It can take a great deal of effort to find a suitable ring and sufficiently large commutative families of matrices over that ring, without making the matrices too large. However, this effort needs to be done only once. When a ring and two matrix families have been found, these choices can be built into the encryption device or software.

To summarize, there are 3 methods available to defeat extended linearization. Making the matrices larger slows down the matrix multiplication. Choosing families of matrices for which d=e=3 requires larger matrices. Using a non-commutative ring requires operator tables which take more storage, and slightly slow down the matrix multiplication. On balance, if there is enough storage for the operator tables, then using a non-commutative ring may be the best option. The matrices can be smaller, which more than compensates for the slower scalar multiplication operation, and the resulting equations are the most difficult to solve.

It is important to note that F and G must be independent families of matrices. If someone tried to take a shortcut and used the same family of matrices for both the left and right sides, with b=c, then instead of $b^2$ distinct products there would be only b(b+1)/2 distinct products, and the security of the method would severely impaired.

It might be thought that it would be sufficient for F and G to have $2^{64}$ matrices each, so that there would be $(2^{64})(2^{64})=2^{128}$ possible pairs of matrices S and T. However, if either F or G contained fewer than $2^{128}$ matrices, then the matrices in the smaller family could be tried one at a time, thereby reducing the set of quadratic equations to linear equations, which can be solved by standard linear algebra methods. Consequently it is necessary that both $p^{b/d}>2^{128}$ and $p^{c/e}>2^{128}$. For d=e=2 the two-sided method can use the same matrix sizes as the one-sided method, for example, p=257 with 32×32 matrices, p=65521 with 16×16 matrices, or p=$2^{31}$−1=2147483647 with 9×9 matrices. For d=e=3 one must use at least p=257 with 48×48 matrices, p=65521 with 24×24 matrices, or p=$2^{31}$−1=2147483647 with 13×13 matrices, but requiring 64-bit arithmetic. For non-commutative rings, using a ring of 256 elements with exclusive-or as the ring addition and a suitable multiplication table, 19×19 matrices are sufficient.

The question naturally arises, why even consider the two-sided method if it requires twice as many multiplier matrices and twice as many matrix multiplications as the one-sided method? There are two reasons. First, quadratic equations are inherently more difficult to solve than linear equations, so one might have greater confidence in the security of the two-sided method. Second, the one-sided method produces b units of key material from each exchange, while the two-sided method produces bc units of key material. So the two-sided method would be preferable if the keys are very large, namely larger than b bytes. Third, the two-sided method can be used to establish several keys using a single exchange. If the sender and the receiver communicate frequently, it may be very desirable to be able to establish multiple keys in a single exchange. For example, using 24×24 matrices with p=65521 each key exchange can establish 71 independent encryption keys of 128 bits each. This works out to just over 7000 elementary operations per key. By contrast, using the Hellman key exchange with 200-digit primes uses 4 exponentiation operations to transmit five independent 128-bit encryption keys, and requires approximately 3,500,000 elementary operations per key.

The sizes for the matrices in F and G given earlier are minimum sizes needed to achieve a particular level of security. The matrices may be set larger than these minimum sizes either to achieve a greater level of security, or to transmit more key material. The sizes of the matrices in F and G can be set independently. For example using the prime p=65521, F could contain 16×16 matrices while G could contain 18×18 matrices, with the common matrix M having the size 16×18.

Not all matrices are equally strong. Matrices with large numbers of zero elements tend to be weaker. One possible rule of thumb might be to reject any common matrix M, or any multiplier matrix S, T, R or Q, where more than half of the elements are 0. This would be rare when the multiplier matrices are chosen randomly, but it is safest to make some check for weak matrices.

There are many different rings. The discussion above considered the rings of integers modulo some prime p. Some other forms of rings that are commonly used in cryptography are integers modulo $2^u$ for some integer u, Gaussian integers, and the Galois Field GF($p^n$). Gaussian integers, or complex integers, are numbers of the form a+bi where a and b are integers, and i is the imaginary square root of −1. Gaussian arithmetic can be performed modulo a prime p. Elements of GF($p^n$) are the polynomials in one variable of degree n−1, whose coefficients are integers modulo p, taken modulo an irreducible polynomial in one variable of degree n, whose coefficients are integers modulo p. The best-known examples of non-commutative rings are quaternions and matrices. This disclosure is intended to cover matrices over any ring.

The methods described in this disclosure for exchanging cryptographic keys require generating a random common matrix and some random multiplier matrices chosen from large commutative families of matrices. The methods would not be practical unless these operations can themselves be performed efficiently.

Choosing a common matrix is simple. Assume, for the sake of illustration, that the matrices are taken over the ring of integers modulo a prime p. Then each of the bc elements of M can be chosen as a pseudorandom number in the range 0 to p−1. Methods for pseudorandom number generation are well-known in the art and require no further explanation. The matrix M can be generated by the sender and transmitted to the receiver for their common use, or vice versa, see FIG. 1 at 11 and FIG. 2 at 21.

Generating any of the multiplier matrices can be achieved with just one matrix multiplication. Assume that there is a matrix-generating device or software routine which produces one matrix from the commutative family each time it is activated or called. This device or program could have a small number m of matrices from the commutative family stored in its memory, say 16≦m≦32. Each time the device is called, it could choose two of these matrices, say $S_i$ and $S_j$, with i≠j, and multiply them together. Recall that the product of two matrices in the family will also be in the family. The product $S_iS_j$ is returned to the caller, and this product will also replace $S_i$ in the stored set of matrices.

The initial set of matrices would have been calculated mathematically, and stored in the device's permanent memory. When the device is first powered on, the matrix generator could, for example, be called 128 times to get it to a sufficiently random state. Those 128 matrices would be discarded, and would not be used for exchanging keys. After that startup procedure, the device or program would generate each multiplier matrix using just one matrix multiplication, as described above. This is just one of many ways the generator could be initialized. This disclosure is not limited to any particular initialization method.

The main advantage of this method is that it is much faster than the method of U.S. Pat. No. 4,200,770. Depending on the sizes of the matrices and the sizes of the primes it could easily be 100 to 1000 times as fast. Another advantage is that it is less likely to suddenly become insecure. The security of Hellman-Diffie-Merkle key exchange rests on the difficulty of solving a mathematical problem called the Discrete Logarithm Problem. Each time an improvement is made in the algorithms for this problem, larger primes must be used. Since Hellman was first disclosed, the size of the primes has risen from 100 to 150 to 200 decimal digits. This increases the time required for exchanging keys. It also means that messages sent in the past with keys exchanged using smaller primes may now be decrypted by the eavesdropper. So, if the messages must be kept secure for a long time, then Hellman key exchange would be a poor choice.

A third improvement is that the present invention is easier to implement. Raising a large number to a large power modulo a large prime is a challenging task to do correctly and efficiently. By contrast, matrix multiplication is an elementary computer task which every programmer, scientist and engineer knows how to do, and the standard method is acceptably efficient.

Further, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A method for enabling a sending party and a receiving party to develop at least one common matrix capable of being used as a cryptographic key for secure communication of at least part of a message X, using computerized devices for storing, processing, transmitting and receiving data, comprising:
   establishing a non-commutative mathematical ring;
   establishing a commutative family F of b×b square matrices over said ring;
   establishing a commutative family G of c×c square matrices over said ring;
   selecting a matrix M of size b×c over said ring, said matrix known to both the sending party and the receiving party;
   the sending party choosing a matrix S from said commutative family F of matrices and a matrix T from said commutative family G of matrices;
   the sending party multiplying said matrix M by said matrix S and said matrix T and transmitting the matrix product SMT to the receiving party;
   the receiving party choosing a matrix R from said commutative family F of matrices and a matrix Q from said commutative family G of matrices;
   the receiving party multiplying said matrix M by said matrix R and said matrix Q and electronically transmitting the matrix product RMQ to the sending party;
   the sending party multiplying the received matrix product RMQ by the sender's matrix S and the sender's matrix T to produce the matrix product SRMQT; and
   the receiving party multiplying the received matrix product SMT by the receiver's matrix R and the receiver's matrix Q to produce the matrix product RSMTQ, which is equal to the matrix product SRMQT because of the commutative property of the two families F and G of matrices; wherein:
   the sending and receiving party have thereby both developed the common matrix product SRMQT=RSMTQ capable of being used as a cryptographic key.

2. The method of claim 1, further comprising using the common matrix product SRMQT=RSMTQ to produce one cryptographic key.

3. The method of claim 1, further comprising using the common matrix product SRMQT=RSMTQ to produce more than one cryptographic key.

4. The method of claim 1, wherein at least part of said common matrix product SRMQT=RSMTQ is used to produce at least one cryptographic key which can be used for encrypting and decrypting at least part of said message X.

5. The method of claim 4, further comprising:
   the sending party using said cryptographic key to encrypt at least part of said message X;
   the sending party transmitting said encrypted message to the receiving party; and
   the receiving party using said cryptographic key to decrypt at least part of said message X.

6. The method of claim 4, further comprising producing at least one of said cryptographic keys using only part of said common matrix product SRMQT=RSMTQ.

7. A system for enabling a sending party and a receiving party to develop at least one common matrix capable of being used as a cryptographic key for secure communication of at least part of a message X, comprising sending party and receiving party computerized devices with associated data storage, processing, transmitting and receiving capacity, configured for:
   establishing a non-commutative mathematical ring;
   establishing a commutative family F of b×b square matrices over said ring;
   establishing a commutative family G of c×c square matrices over said ring;
   selecting a matrix M of size b×c over said ring, matrix known to both the sending party and the receiving party;
   the sending party choosing a matrix S from said commutative family F of matrices and a matrix T from said commutative family G of matrices;
   the sending party multiplying said matrix M by said matrix S and said matrix T and electronically transmitting the matrix product SMT to the receiving party;
   the receiving party choosing a matrix R from said commutative family F of matrices and a matrix Q from said commutative family G of matrices;
   the receiving party multiplying said matrix M by said matrix R and said matrix Q and transmitting the matrix product RMQ to the sending party;
   the sending party multiplying the received matrix product RMQ by the sender's matrix S and the sender's matrix T to produce the matrix product SRMQT; and
   the receiving party multiplying the received matrix product SMT by the receiver's matrix R and the receiver's matrix Q to produce the matrix product RSMTQ, which is equal to the matrix product SRMQT because of the commutative property of the two families F and G of matrices; wherein:
   the sending and receiving party have thereby both developed the common matrix product SRMQT=RSMTQ capable of being used as a cryptographic key.

8. The system of claim 7, further comprising said computerized devices configured for using the common matrix product SRMQT=RSMTQ to produce one cryptographic key.

9. The system of claim 7, further comprising said computerized devices configured for using the common matrix product SRMQT=RSMTQ to produce more than one cryptographic key.

10. The system of claim 7, wherein at least part of said common matrix product SRMQT=RSMTQ is used to produce at least one cryptographic key which can be used for encrypting and decrypting at least part of said message X.

11. The system of claim 10, further comprising said computerized devices configured for producing at least one of said cryptographic keys using only part of said common matrix product SRMQT=RSMTQ.

12. The system of claim 10, further comprising:
the sending party using said cryptographic key to encrypt at least part of said message X;
the sending party transmitting said encrypted message to the receiving party; and
the receiving party using said cryptographic key to decrypt at least part of said message X.

13. A non-transitory computer-readable medium comprising instructions executable by a computer processor for enabling a sending party and a receiving party to develop at least one common matrix capable of being used as a cryptographic key for secure communication of at least part of a message X, the computer-readable medium comprising one or more computerized instructions for:
establishing a non-commutative mathematical ring;
establishing a commutative family F of b×b square matrices over said ring;
establishing a commutative family G of c×c square matrices over said ring;
selecting a matrix M of size b×c over said ring, said matrix known to both the sending party and the receiving party;
the sending party choosing a matrix S from said commutative family F of matrices and a matrix T from said commutative family G of matrices;
the sending party multiplying said matrix M by said matrix S and said matrix T and transmitting the matrix product SMT to the receiving party;
the receiving party choosing a matrix R from said commutative family F of matrices and a matrix Q from said commutative family G of matrices;
the receiving party multiplying said matrix M by said matrix R and said matrix Q and transmitting the matrix product RMQ to the sending party;
the sending party multiplying the received matrix product RMQ by the sender's matrix S and the sender's matrix T to produce the matrix product SRMQT; and
the receiving party multiplying the received matrix product SMT by the receiver's matrix R and the receiver's matrix Q to produce the matrix product RSMTQ, which is equal to the matrix product SRMQT because of the commutative property of the two families F and G of matrices; wherein:
the sending and receiving party have thereby both developed the common matrix product SRMQT=RSMTQ capable of being used as a cryptographic key.

14. The computer-readable medium of claim 13, further comprising one or more computerized instructions for using the common matrix product SRMQT=RSMTQ to produce more than one cryptographic key.

15. The computer-readable medium of claim 13, wherein at least part of said common matrix product SRMQT=RSMTQ is used to produce at least one cryptographic key which can be used for encrypting and decrypting at least part of said message X.

16. The computer-readable medium of claim 15, further comprising one or more computerized instructions for:
the sending party using said cryptographic key to encrypt at least part of said message X;
the sending party transmitting said encrypted message to the receiving party; and
the receiving party using said cryptographic key to decrypt at least part of said message X.

17. The computer-readable medium of claim 16, further comprising one or more computerized instructions for using the common matrix product SRMQT=RSMTQ to produce one cryptographic key.

18. The computer-readable medium of claim 15, further comprising one or more computerized instructions for producing at least one of said cryptographic keys using only part of said common matrix product SRMQT=RSMTQ.

\* \* \* \* \*